US012599967B2

(12) United States Patent
Li et al.

(10) Patent No.: US 12,599,967 B2
(45) Date of Patent: Apr. 14, 2026

(54) NON-DESTRUCTIVE TESTING METHOD FOR LOF DEFECTS, AND A TESTING STANDARD PART AND MANUFACTURING METHOD THEREFOR

(71) Applicants: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

(72) Inventors: Yali Li, Shanghai (CN); Liming Lei, Shanghai (CN); Jun Fu, Shanghai (CN); Yanli He, Shanghai (CN); Yinlan Zheng, Shanghai (CN)

(73) Assignees: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

( * ) Notice: Subject to any disclaimer, the term of this patent is extended or adjusted under 35 U.S.C. 154(b) by 655 days.

(21) Appl. No.: 17/920,572

(22) PCT Filed: Dec. 28, 2020

(86) PCT No.: PCT/CN2020/139983
§ 371 (c)(1),
(2) Date: Oct. 21, 2022

(87) PCT Pub. No.: WO2021/212894
PCT Pub. Date: Oct. 28, 2021

(65) Prior Publication Data
US 2023/0158572 A1 May 25, 2023

(30) Foreign Application Priority Data
Apr. 22, 2020 (CN) .......................... 202010319677.7

(51) Int. Cl.
B22F 10/28 (2021.01)
B22F 10/38 (2021.01)
(Continued)

(52) U.S. Cl.
CPC .............. B22F 10/28 (2021.01); B22F 10/38 (2021.01); B22F 10/85 (2021.01); B22F 12/90 (2021.01); B33Y 10/00 (2014.12); B33Y 50/02 (2014.12)

(58) Field of Classification Search
CPC .......... B22F 10/28; B22F 10/38; B22F 10/85; B22F 12/90; B22F 10/36; B22F 10/366;
(Continued)

(56) References Cited

U.S. PATENT DOCUMENTS 10,549,519 B2    2/2020  Marchione
2016/0349215 A1*  12/2016  Todorov ................ B29C 64/386
(Continued)

FOREIGN PATENT DOCUMENTS

CN     103240414 A     8/2013
CN     105834423 A     8/2016
(Continued)

OTHER PUBLICATIONS

Zhang et al., "Microstructure and mechanical properties of Hastelloy-X produced by selective laser melting," IOP Conference Series: Materials Science and Engineering, IOP Publishing Ltd, Mar. 31, 2020, vol. 768, 8 pages (Year: 2020).*
(Continued)

*Primary Examiner* — John A Hevey
(74) *Attorney, Agent, or Firm* — Maier & Maier, PLLC

(57) ABSTRACT

A non-destructive testing method for lack-of-fusion (LOF) defects, and a testing standard part and a manufacturing method thereof, used for the non-destructive testing of LOF defects of an additive manufacturing workpiece. The manu-
(Continued)

Step A
setting a LOF defect area of the standard part, in the LOF defect area, a proportion of the LOF defects in the LOF defect area is set as a first proportion value Step B
selecting an additive manufacturing forming process for manufacturing the LOF defect area to obtain a first process parameter of the additive manufacturing forming process corresponding to the first proportion value Step C
performing the additive manufacturing forming process based on the first process parameter to form the LOF defect area facturing method of the LOF defect standard part comprises: step A, setting a LOF defect area of the standard part, in the LOF defect area, a proportion of the LOF defects in the LOF defect area is set as a first proportion value; step B, selecting an additive manufacturing forming process for manufacturing the LOF defect area to obtain a first process parameter of the additive manufacturing forming process corresponding to the first proportion value; step C, performing the additive manufacturing forming process based on the first process parameter to form the LOF defect area.

6 Claims, 6 Drawing Sheets

(51) Int. Cl.
  *B22F 10/85* (2021.01)
  *B22F 12/90* (2021.01)
  *B33Y 10/00* (2015.01)
  *B33Y 50/02* (2015.01)

(58) Field of Classification Search
  CPC ......... B22F 10/00; B33Y 10/00; B33Y 50/02; B33Y 40/00; Y02P 10/25; G01N 1/28; G01N 1/44; G01N 2203/027; G01N 2203/0298; G01N 2203/0641
  See application file for complete search history.

(56) References Cited

U.S. PATENT DOCUMENTS

| | | | | |
|---|---|---|---|---|
| 2018/0193959 | A1 | 7/2018 | Marchione | |
| 2020/0223146 | A1* | 7/2020 | Totzeck | B29C 64/188 |
| 2020/0242495 | A1* | 7/2020 | Roychowdhury | B22F 10/36 |
| 2022/0042924 | A1* | 2/2022 | Beckett | B22F 10/38 |
| 2023/0141321 | A1* | 5/2023 | Fu | B22F 10/366 |
| | | | | 219/121.85 |
| 2023/0146848 | A1* | 5/2023 | Lei | B23K 26/342 |
| | | | | 219/121.85 |

FOREIGN PATENT DOCUMENTS

| | | | |
|---|---|---|---|
| CN | 106735221 | A | 5/2017 |
| CN | 106825574 | A | 6/2017 |
| CN | 107520449 | A | 12/2017 |
| CN | 108195856 | A | 6/2018 |
| CN | 108436081 | A | 8/2018 |
| CN | 108724706 | A | 11/2018 |
| CN | 108817386 | A | 11/2018 |
| CN | 108931535 | A | 12/2018 |
| CN | 109277568 | A | 1/2019 |
| CN | 109870338 | A | 6/2019 |
| CN | 110064756 | A | 7/2019 |
| CN | 110414873 | A | 11/2019 |
| CN | 110824021 | A | 2/2020 |
| CN | 111036908 | A | 4/2020 |
| CN | 111207986 | A | 5/2020 |

OTHER PUBLICATIONS

Zhang et al., "Microstructure and mechanical properties of Hastelloy-X produced by selective laser melting," IOP Conf. Series: Materials Science and Engineering, 768 (2020), pp. 1-8 (Year: 2020).*
First Search Report issued on May 14, 2020, in corresponding Chinese Application No. 2020103196777, 11 pages.
Supplementary Search Report issued on Jun. 18, 2020, in corresponding Chinese Application No. 2020103196777, 4 pages.
Lu et al., "Effect of Line Energy Density on Defects of 316L Stainless Steel Prepared by Selective Laser Melting", Applied Laser, Feb. 2019, vol. 39, No. 1, 7 pages (including English-language abstract).
Huipeng et al., "Microstructural Evolution and Tensile Property of Hastelloy-X Alloys Produced by Selective Laser Melting", Chinese Journal of Layers, Feb. 2017, vol. 44, No. 2, 6 pages (including English-language abstract).
International Search Report mailed Feb. 25, 2021, in corresponding to International Application No. PCT/CN2020/139983; 8 pages (with English Translation).
Extended Search Report issued on Apr. 19, 2024, in corresponding European Application No. 20932290.8, 12 pages.
Zhang et al., "Microstructure and Mechanical Properties of Hastelloy-X Produced by Selective Laser Melting", IOP Conference Series: Materials Science and Engineering, IOP Publishing Ltd, Mar. 31, 2020, vol. 768, 8 pages.

* cited by examiner

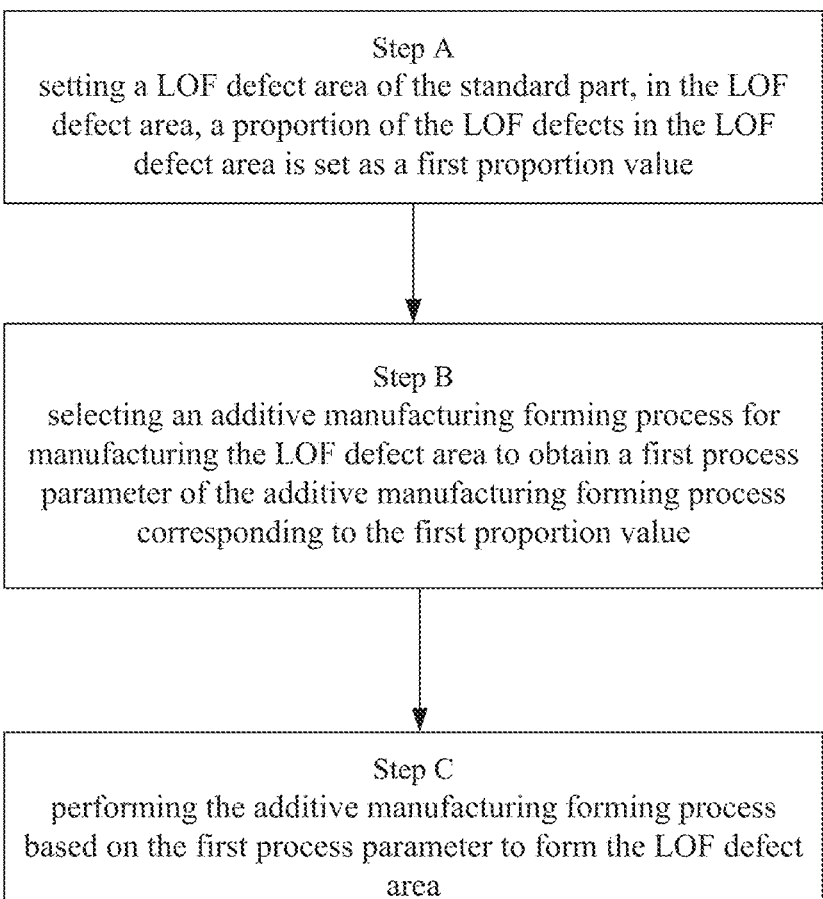

Step A
setting a LOF defect area of the standard part, in the LOF
defect area, a proportion of the LOF defects in the LOF
defect area is set as a first proportion value Step B
selecting an additive manufacturing forming process for
manufacturing the LOF defect area to obtain a first process
parameter of the additive manufacturing forming process
corresponding to the first proportion value Step C
performing the additive manufacturing forming process
based on the first process parameter to form the LOF defect
area

Fig. 1

$$a = 753.27e^{\frac{-\eta}{13.4}} + 0.19$$

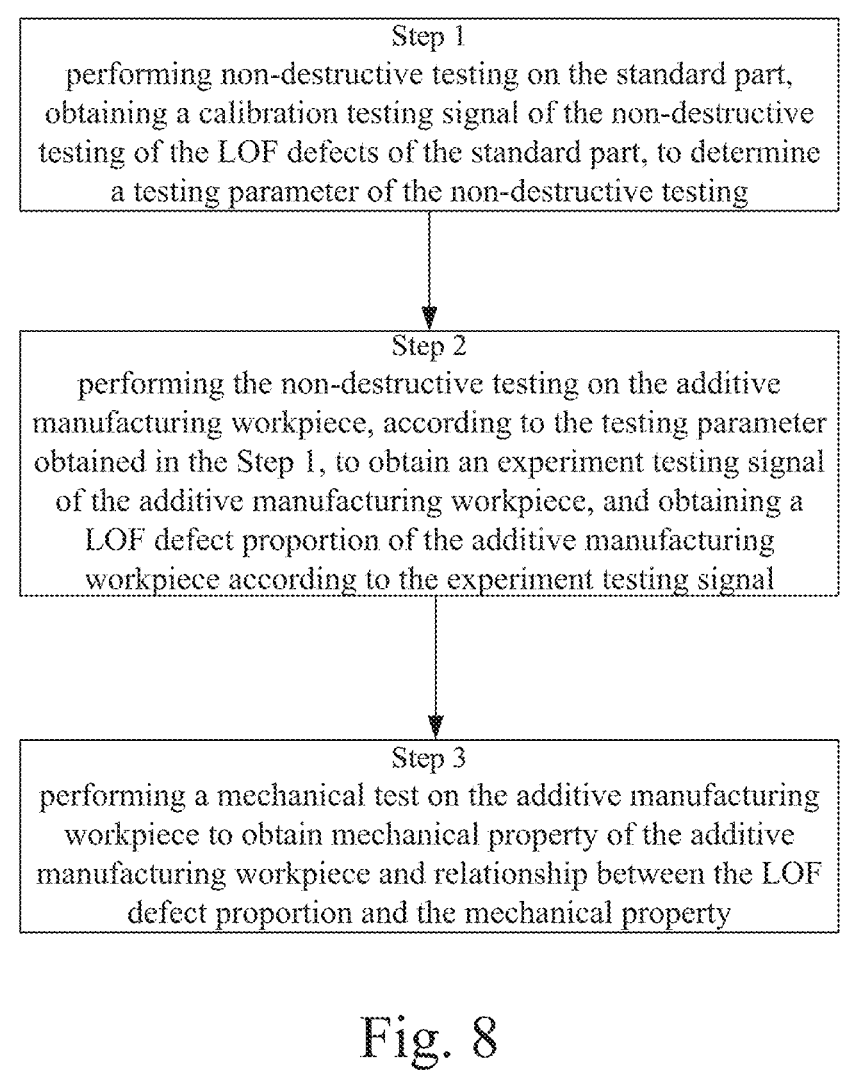

Step 1
performing non-destructive testing on the standard part, obtaining a calibration testing signal of the non-destructive testing of the LOF defects of the standard part, to determine a testing parameter of the non-destructive testing Step 2
performing the non-destructive testing on the additive manufacturing workpiece, according to the testing parameter obtained in the Step 1, to obtain an experiment testing signal of the additive manufacturing workpiece, and obtaining a LOF defect proportion of the additive manufacturing workpiece according to the experiment testing signal Step 3
performing a mechanical test on the additive manufacturing workpiece to obtain mechanical property of the additive manufacturing workpiece and relationship between the LOF defect proportion and the mechanical property

Fig. 8

NON-DESTRUCTIVE TESTING METHOD FOR LOF DEFECTS, AND A TESTING STANDARD PART AND MANUFACTURING METHOD THEREFOR

TECHNICAL FIELD

The present invention relates to the field of processing quality testing of workpieces, in particular to a testing method for LOF defects in an additive manufacturing workpiece, and a testing standard part and a manufacturing method thereof.

BACKGROUND

Additive manufacturing (AM) technology is commonly known as 3D printing and three dimension printing technology. At present, metal additive manufacturing technology is gradually mature and has been widely used in aerospace, medical treatment, automobile, nuclear power and other fields. For example, selective laser melting (SLM) is considered to be one of the most potential AM technologies. Because laser beam with fine focusing spot is used as forming energy source, high-speed and high-precision scanning galvanometer is used as processing beam control unit, and thinner layer thickness control technology is used, compared with other AM technologies, SLM technology has advantages in obtaining high-density and high-precision formed parts, can complete direct forming of complex cavity, surface, thin wall and variable cross-section parts, and is widely used in aerospace and other fields, such as aero-engine pre-rotating nozzle, fuel nozzle, turbine blade and other parts.

Due to the complex phase transformation process of rapid melting and solidification of metal powder materials in SLM process, SLM components are prone to lack-of-fusion (LOF) defects. The principle is that due to the lack of input laser energy in the process of selective laser melting and forming, the width of molten pool is small, and the powder on the scanning path cannot be completely superimposed. Moreover, because the SLM process is printing layer by layer, once local LOF defect occurs, the surface will be rough, and the rough surface will hinder the flow of molten metal, resulting in defects in the new layer.

For the testing methods of LOF defects, the common methods are to sample the printed workpiece, observe it under the microscope, and analyze the position and proportion of the LOF defects, but this method will damage the workpiece.

In present, non-destructive testing (NDT) methods (such as industrial CT testing, ultrasonic testing, radiographic testing, etc.) are widely used to test features, such as LOF position and LOF defect proportion of parts, in SLM components for Aerospace, so as to analyze and evaluate whether the parts meet the service requirements. Taking industrial CT testing as an example, the general steps of traditional NDT methods are designing a three-dimensional model with hole structure in the design stage, wherein the hole diameter is 0.1 mm for example, or a plurality of groups such as 0.1 mm, 0.2 mm and 0.5 mm; manufacturing a standard part with holes according to the three-dimensional model and conducting CT testing and calibration on the standard part to obtain hole defects with hole diameter of 0.1 mm; getting a corresponding calibration testing signal and determining CT testing parameters that can clearly observe the hole defects; then performing NDT on the workpiece according to the parameters to obtain an experiment testing signal of the workpiece, and comparing the experiment testing signal with the calibration testing signal to obtain the LOF defect condition of the workpiece, including features such as LOF position and LOF defect proportion.

However, the inventor found in long-term practice that the above method cannot accurately test the condition of LOF defects, mainly because it can only clearly test the testing parameters of holes but cannot accurately reflect the condition of LOF defects.

Therefore, there is a need in the art for a testing method for testing the LOF defect of an additive manufacturing workpiece, and a testing standard part and a manufacturing method thereof, so as to realize accurate NDT of LOF defects of the additive manufacturing workpiece, and further test the relationship between the LOF defects of the additive manufacturing workpiece and the mechanical properties thereof.

SUMMARY

The purpose of the present invention is to provide a testing method for LOF defects in an additive manufacturing workpiece, and a testing standard part and a manufacturing method thereof, so as to realize the accurate non-destructive testing of LOF defects in the workpiece manufactured by additive material.

According to one aspect of the present invention, a manufacturing method of a LOF defect standard part, used for non-destructive testing of LOF defects of an additive manufacturing workpiece, comprising: step A, setting a LOF defect area of the standard part, in the LOF defect area, a proportion of the LOF defects in the LOF defect area is set as a first proportion value; step B, selecting an additive manufacturing forming process for manufacturing the LOF defect area to obtain a first process parameter of the additive manufacturing forming process corresponding to the first proportion value; and step C, performing the additive manufacturing forming process based on the first process parameter to form the LOF defect area.

In one or more embodiments of the manufacturing method, in the step B, the additive manufacturing forming process is a laser selective melting forming process, and the first process parameter comprises a first laser linear energy density. The higher the set first proportion value, the higher the correspondingly set first laser linear energy density.

In one or more embodiments of the manufacturing method, the material of the LOF defect area is Hastelloy X alloy. The first proportion value is 0.4%-5.7%. The first process parameter comprises: a first laser linear energy density of 66 J/m-113 J/m, a first scanning spacing of 0.10 mm-0.12 mm, a first strip width of 7 mm-10 mm, a first strip overlap of 0. mm-0.05 mm, and a first paving powder thickness of 0.02 mm-0.03 mm. The first laser linear energy density is determined by the following formula:

$$a = 753.27e^{\frac{-\eta}{13.4}} + 0.19$$

wherein a is the first proportion value, and $\eta$ is the first laser linear energy density.

In one or more embodiments of the manufacturing method, in the step B, the first proportion value is 5.7%, the first laser linear energy density is 66 J/m, the first scanning spacing is 0.12 mm, the first strip width is 10 mm, the first strip overlap is 0 mm, and the first paving powder thickness is 0.03 mm; alternatively, in the step B, the first proportion value is 0.4%, the first laser linear energy density is 113 J/m, the first scanning spacing is 0.1 mm, the first strip width is 7 mm, the first strip overlap is 0.05 mm, and the first paving powder thickness is 0.03 mm; alternatively, in the step B, the first proportion value is 1.7%, the first laser linear energy density is 82 J/m, the first scanning spacing is 0.11 mm, the first strip width is 9 mm, the first strip overlap is 0.03 mm, and the first paving powder thickness is 0.03 mm.

In one or more embodiments of the manufacturing method, the step A further comprises: setting a body area of the standard part, and the body area is free of LOF defects. The step B further comprises: selecting another additive manufacturing forming process for manufacturing the body area to obtain a second process parameter of the another additive manufacturing forming process corresponding to the body area. The step C further comprises: performing the another additive manufacturing forming process based on the second process parameter to form the body area.

In one or more embodiments of the manufacturing method, in the step B, the another additive manufacturing forming process is a laser selective melting forming process, the material in the body area is Hastelloy X alloy, and the second process parameter of the another additive manufacturing forming process comprises: a second laser linear energy density of 170 J/m-200 J/m, a second scanning spacing of 0.08 mm-0.10 mm, a second strip width of 4 mm-6 mm, a second strip overlap of 0.06 mm-0.10 mm, and a second paving powder thickness of 0.02 mm-0.03 mm.

A LOF defect standard part according to another aspect of the present invention is manufactured by the manufacturing method described in any one of the above.

According to another aspect of the present invention, a non-destructive testing method for LOF defects, used for testing LOF defects of an additive manufacturing workpiece, comprises: step 1, performing non-destructive testing on the above-mentioned standard part, obtaining a calibration testing signal of the non-destructive testing of LOF defects of the standard part, to determine a testing parameter of the non-destructive testing; and step 2, performing the non-destructive testing on the additive manufacturing workpiece, according to the testing parameter obtained in the step 1, to obtain an experiment testing signal of the additive manufacturing workpiece, and obtaining a LOF defect proportion of the additive manufacturing workpiece according to the experiment testing signal.

In one or more embodiments of the non-destructive testing method, a step 3, performing mechanical test on the additive manufacturing workpiece to obtain mechanical property of the additive manufacturing workpiece and relationship between the LOF defect proportion and the mechanical property, is also comprised.

In one or more embodiments of the non-destructive testing method, the step 1 comprises: manufacturing the above-mentioned standard part; and performing the non-destructive testing to obtain the calibration testing signal of the non-destructive testing of LOF defects of the standard part to determine the testing parameter of the non-destructive testing.

Summary, the progressive effects of the present invention comprise obtaining the detection standard part with LOF defects through the adjustment of process parameters, for more truly reflecting the LOF defects of the additive manufacturing workpiece, and obtaining more accurate calibration results and NDT parameters, so as to improve the accuracy and reliability of the NDT results of LOF defects of the additive manufacturing workpiece, and further obtain a more accurate and reliable relationship between the LOF defects of the additive manufacturing workpiece and the mechanical properties of the additive manufacturing workpiece.

BRIEF DESCRIPTION OF THE DRAWINGS

The specific features and performance of the present invention are further given by the following embodiments and accompanying drawings.

FIG. 1 is a flowchart of the manufacturing method of the testing standard part for LOF defects of the additive manufacturing workpiece according to one or more embodiments.

FIG. 8 is a flowchart of the method for testing LOF defects of the additive manufacturing workpiece according to one or more embodiments.

DETAILED DESCRIPTION OF EMBODIMENTS

A variety of different embodiments or examples for implementing the subject technical proposal are disclosed below. In order to simplify the disclosure, specific examples of each element and arrangement are described below. Certainly, these are only examples and do not limit the protection scope of the present invention. "One embodiment", "an embodiment", and/or "some embodiments" mean a feature, structure or characteristic related to at least one embodiment of the present application. Therefore, it should be emphasized and noted that "an embodiment" or "one embodiment" or "an alternative embodiment" mentioned twice or more in different positions in this specification do not necessarily refer to the same embodiment. In addition, some features, structures or characteristics in one or more embodiments of the present application may be combined appropriately.

A flowchart is used in the present application to illustrate the operation performed by the system according to an embodiment of the present application. It should be understood that the preceding or following operations are not necessarily performed accurately in order. Other operations can also be added into these processes, alternatively, one or more steps of operations can also be removed from these processes.

As shown in FIG. 1, in an embodiment, the manufacturing method of the testing standard part for testing lack-of-fusion (LOF) defects of the additive manufacturing workpiece comprises:

step A, setting a LOF defect area of the standard part, in the LOF defect area, a proportion of the LOF defects in the LOF defect area is set as a first proportion value.

Figure 2:
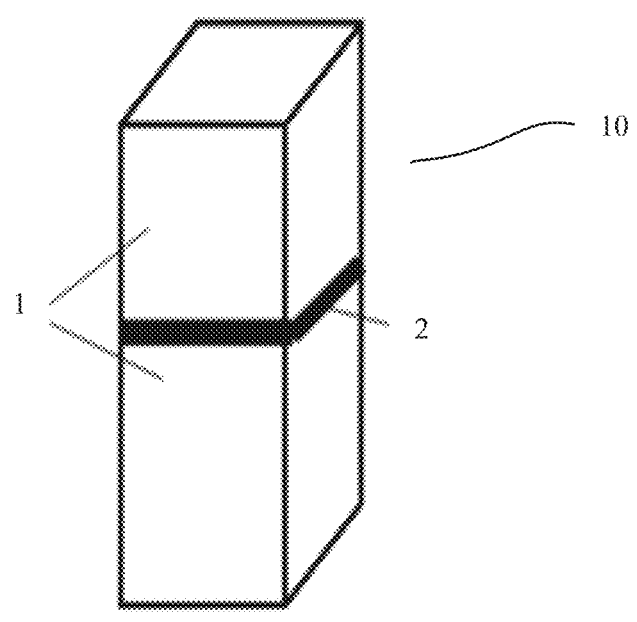
FIG. 2 is a structural diagram of the standard part according to one or more embodiments.

Specifically, the process of setting the LOF defect area can be realized by UG and other computer-aided design software. Referring to FIG. 2, the specific structure of the standard part 10 can be that the standard part 10 comprises a body area 1 and a LOF defect area 2, and the body area 1 is free of LOF defects. However, it is not limited to this. The LOF defect area 2 may not be limited to one LOF defect area 2 shown in FIG. 2, but may be a plurality of LOF defect areas. An example of a limit is that in order to calibrate the possible case that the whole workpiece has LOF defects, the standard part 10 is set to have only the LOF defect area 2. The area proportion of the LOF defects to the LOF defect area 2 is the first proportion value, and the first proportion value is set according to the needs of the data points to be calibrated. In one or more embodiments of standard part 10 with a plurality of LOF defect areas 2, the plurality of LOF defect areas 2 may have different first proportion values, which can accelerate the calibration process to realize the simultaneous calibration of the calibration testing signals corresponding to different LOF defect proportions.

step B, selecting an additive manufacturing forming process for manufacturing the LOF defect area to obtain a first process parameter of the additive manufacturing forming process corresponding to the first proportion value; and step C, performing the additive manufacturing forming process based on the first process parameter to form the LOF defect area.

Figure 3:
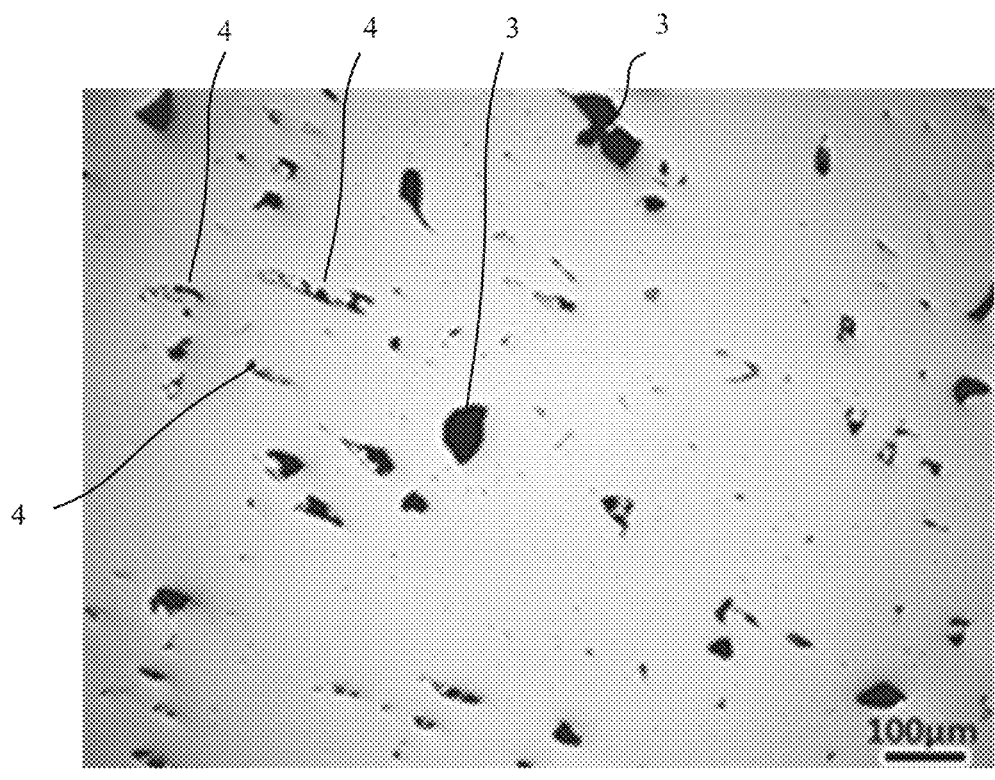
FIG. 3 is an optical microscope photograph of LOF defects with the first proportion value according to an embodiment.

Specifically, in an embodiment for example, the first proportion value is set to 5.7%, the additive manufacturing process is laser selective melting forming process, an EOS M280 laser selective melting forming equipment is adopted, the forming material is Hastelloy X alloy, and the first process parameters are: the first laser linear energy density is 66 J/m, the first scanning spacing is 0.12 mm, the first strip width is 10 mm, the first strip overlap is 0 mm, and the first paving powder thickness is 0.02 mm-0.03 mm, which is 0.03 mm in this embodiment. The obtained optical microscope photograph of the LOF defect area is shown in FIG. 3.

Figure 4:
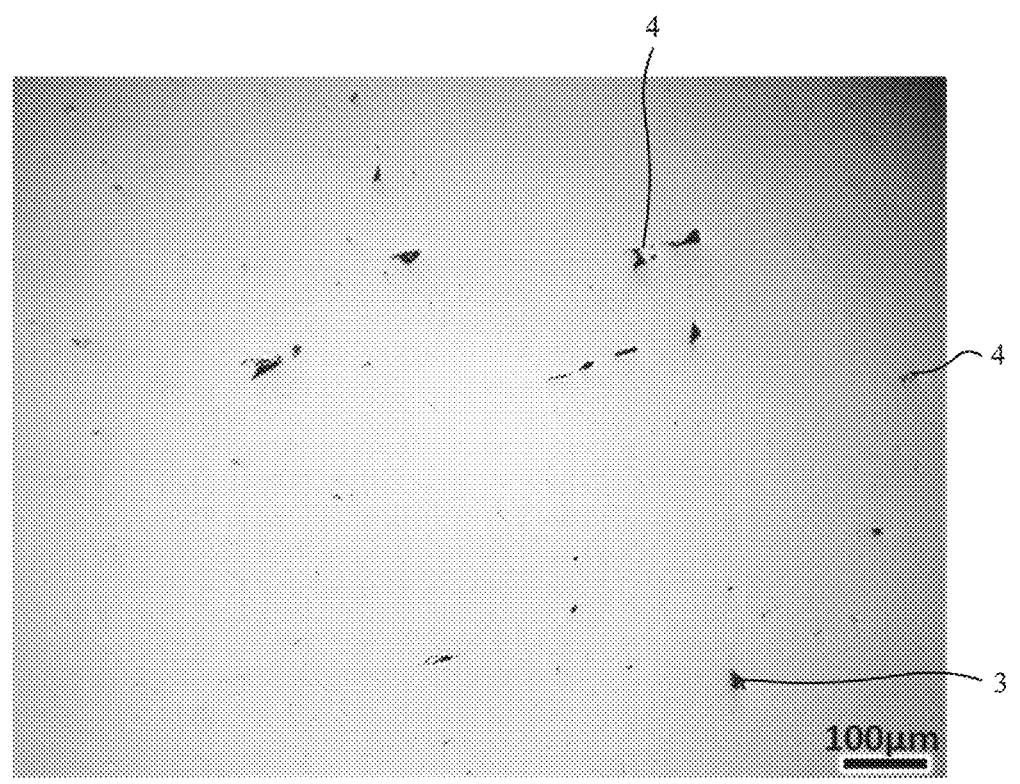
FIG. 4 is an optical microscope photograph of LOF defects with the first proportion value according to another embodiment.

In another embodiment for example, the first proportion value is set to 0.4%, the additive manufacturing process is laser selective melting forming process, an EOS M280 laser selective melting forming equipment is adopted, the forming material is Hastelloy X alloy, and the first process parameters are: the first laser linear energy density is 113 J/m, the first scanning spacing is 0.1 mm, the first strip width is 7 mm, the first strip overlap is 0.05 mm, and the first paving powder thickness is 0.02 mm-0.03 mm, which is 0.03 mm in this embodiment. The obtained optical microscope photograph of the LOF defect area is shown in FIG. 4.

Figure 5:
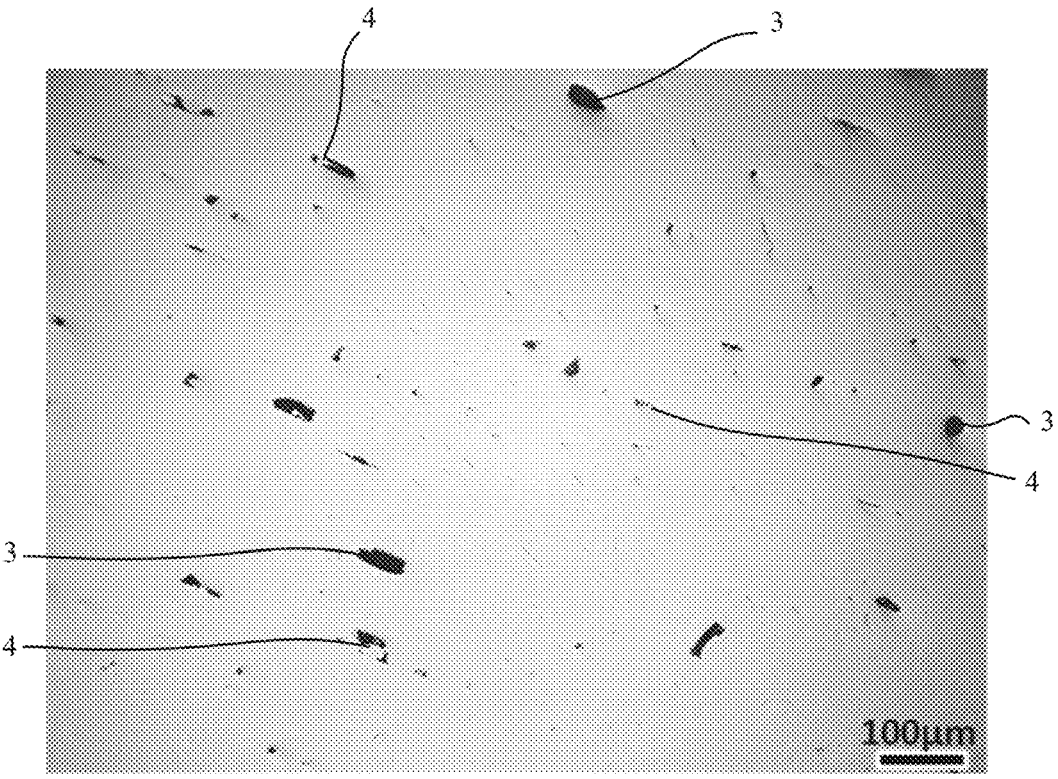
FIG. 5 is an optical microscope photograph of LOF defects with the first proportion value according to another embodiment.

In another embodiment for example, the first proportion value is set to 1.7%, the additive manufacturing process is laser selective melting forming process, an EOS M280 laser selective melting forming equipment is adopted, the forming material is Hastelloy X alloy, and the first process parameters are: the first laser linear energy density is 82 J/m, the first scanning spacing is 0.11 mm, the first strip width is 9 mm, the first strip overlap is 0.03 mm, and the first paving powder thickness is s 0.02 mm-0.03 mm, which is 0.03 mm in this embodiment. The obtained optical microscope photograph of the LOF defect area is shown in FIG. 5.

The specific method of strip printing is well known to those skilled in the art. For example, the user manual of EOS M280 laser selective melting forming equipment can be referred to, alternatively, academic papers such as sun Z, Tan x, tor s B, et al. Selective laser melting of stainless steel 316L with low porosity and high build rates [J]Materials & design, 2016, 104: 197-204 can also be referred to, and other references will not be repeated here.

The first process parameters corresponding to the first proportion value can be obtained by test, or calculated by consulting literature and fitting simulation. Generally speaking, it is tested or calculated according to laser volume energy density. The volume energy density comprises the laser linear energy density, the overlapping width of strip and the scanning spacing. The principle thereof is that LOF defects are mainly caused by insufficient energy in the forming process. The smaller the strip overlap, the less sufficient metallurgical bonding can be formed after the material at the joint of the strip area is melted, resulting in the LOF defects at the places with insufficient metallurgical bonding. The larger the scanning spacing is, the more the material between adjacent scanning tracks will produce LOF defects due to insufficient metallurgical bonding.

However, in the study, the inventor accidentally found that for the first proportion value of 0.4%-5.7%, within the range of the first scanning spacing of 0.10 mm-0.12 mm, the first strip width of 7 mm-10 mm, the first strip overlap of 0 mm-0.05 mm, and the paving powder thickness of 0.02 mm-0.03 mm, the formation of LOF defects is only related to the laser linear energy density, and can be quickly obtained by the formula:

$$a = 753.27e^{\frac{-\eta}{13.4}} + 0.19$$

wherein a is the first proportion value, and $\eta$ is the first laser linear energy density.

Figure 6:
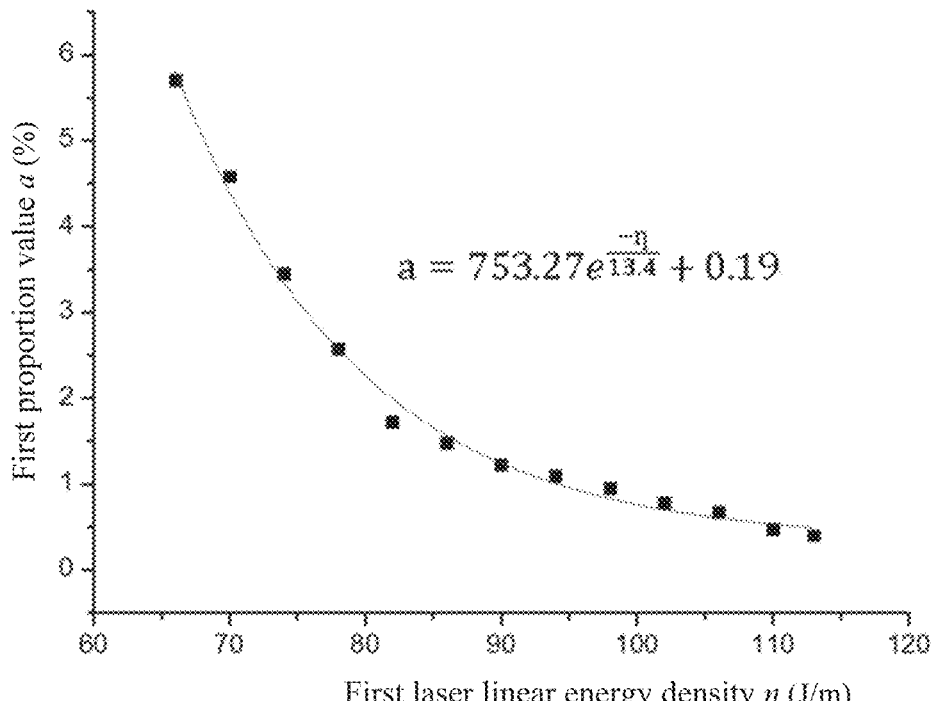
FIG. 6 is a graph of the laser linear energy density corresponding to the first proportion value.

As shown in FIG. 6, the actual values of the first proportion value and the first laser energy density are basically consistent with the formula. The specific actual values are shown in the table below:

TABLE 1

| actual values of the first proportion value and the first laser energy density | |
| --- | --- |
| First laser linear energy density (J/m) | First proportion value (%) |
| 66 | 5.70 |
| 70 | 4.63 |
| 74 | 3.52 |
| 78 | 2.46 |
| 82 | 1.72 |
| 86 | 1.45 |
| 90 | 1.21 |
| 94 | 1.06 |
| 98 | 0.89 |
| 102 | 0.72 |
| 106 | 0.55 |
| 110 | 0.46 |
| 113 | 0.39 |

Therefore, for the range of the first proportion value of 0.4%-5.7%, the corresponding first process parameters can be determined quickly and accurately through the formula to improve the manufacturing efficiency.

In addition, it can also be seen from FIG. 3 to FIG. 5 that there are only individual LOF defect within the range of the first proportion value of 0.4%-5.7%, and other defect forms such as crack defects will not be mixed. Therefore, the manufactured standard part can obtain more accurate testing parameters for testing LOF defects.

Those skilled in the art can understand that the additive manufacturing process in the above embodiment is a laser selective melting forming process, which is not limited to this. Any workpiece with additive manufacturing process that may produce LOF defects can be applicable. Additionally, the material is not limited to Hastelloy X alloy, but also other materials. The Hastelloy X alloy used here is widely used in high-density and high-precision formed parts, and is widely used in aerospace and other fields, such as aero-engine pre-rotating nozzle, fuel nozzle, turbine blade and other parts. The principle of setting the range of the first proportion value to 0.4%-5.7% is also that according to the discovery of the inventor in long-term practice, the LOF defect with the first proportion value of 0.4%-5.7% has the greatest impact on the high-density and high-precision formed parts formed by laser selective melting of Hastelloy X alloy. If the first proportion value is less than 0.4%, it can be similar to no LOF defect and has limited impact on the performance of the workpiece. If the first proportion value is greater than 5.7%, the poor quality of the scanning layer (e.g. large roughness, abnormal noise of the powder spreading knife, etc.) can be directly observed during the forming process. Therefore, there is no need to perform non-destructive testing for LOF defects, and the formed part can be directly discarded and reprinted for manufacturing without subsequent impact. It can be understood that the above description shows that the standard parts manufactured by the method of this disclosure can accurately calibrate the calibration testing signal corresponding to the first proportion value of 0.4%-5.7%, so as to accurately test the LOF defects of the workpiece with LOF defect proportion of 0.4%-5.7%, which is especially suitable for non-destructive testing of high-density and high-precision formed parts formed by laser selective melting of Hastelloy X alloy. It can be understood that this disclosure is also applicable to other materials, other workpieces with additive manufacturing process that may produce LOF defects. Additionally, the first proportion value is not limited to 0.4%-5.7%, but also other ranges.

Figure 7:
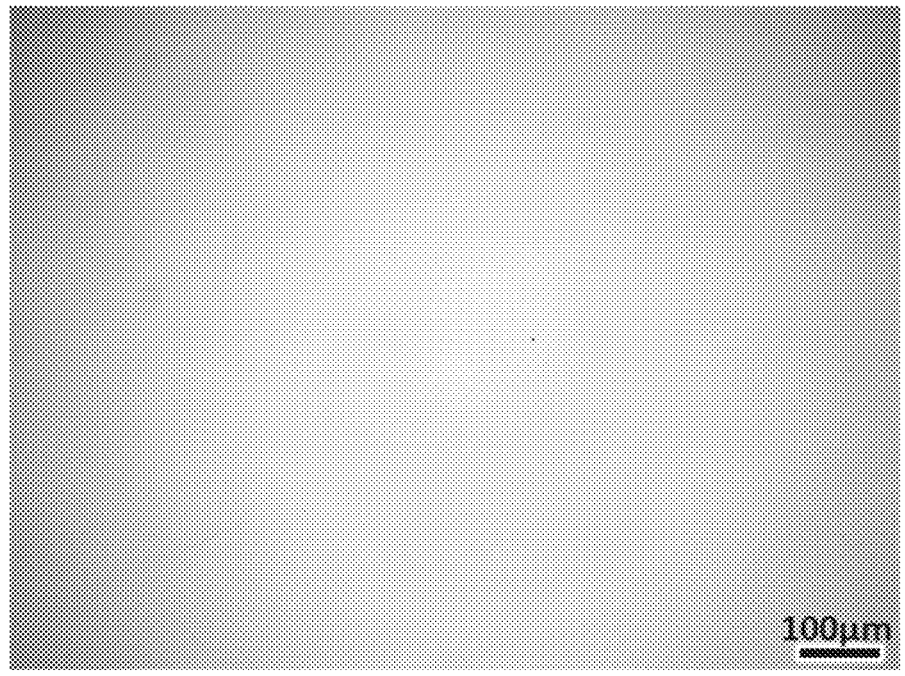
FIG. 7 is an optical microscope photograph of the body area of the standard part without LOF defects according to one or more embodiments.

In some embodiments, for standard parts with the body area 1, the step B also comprises the additive manufacturing of the body area, which can be performed by another additive manufacturing process, whose process parameters are the second process parameters. In an embodiment, the other additive manufacturing and forming process is laser selective melting forming process, comprising that the material in the body area is Hastelloy X alloy and the second process parameters comprise: a second laser linear energy density of 170 J/m-200 J/m, a second scanning spacing of 0.08 mm-0.10 mm, a second strip width of 4 mm-6 mm, a second strip overlap of 0.06 mm-0.10 mm, and a second paving powder thickness of 0.02 mm-0.03 mm. In this embodiment, the second laser line energy density is 185 J/m, the second scanning spacing is 0.09 mm, the second strip width is 5 mm, the second strip overlap is 0.06 mm, and the second paving powder thickness is 0.03 mm. The optical microscope photograph of the obtained body area is shown in FIG. 7.

Referring to FIG. 8, in an embodiment, the non-destructive testing method for testing LOF defects of an additive manufacturing workpiece may comprise the following steps:

step 1, performing non-destructive testing on the standard part 10 manufactured by the above manufacturing method, obtaining a calibration testing signal of the non-destructive testing of LOF defects of the standard part 10, and determining a testing parameter of the non-destructive testing that can clearly reflect the LOF defects; and step 2, performing the non-destructive testing on the additive manufacturing workpiece, according to the testing parameter obtained in the step 1, to obtain an experiment testing signal of the additive manufacturing workpiece, and obtaining a LOF defect proportion of the additive manufacturing workpiece according to the experiment testing signal.

Specifically, taking the non-destructive testing of industrial CT for example, non-destructive testing of the standard part 10 is performed first, and the testing parameters are debugged until the LOF defects can be clearly reflected to obtain the non-destructive testing image of the standard part. In the step 2, non-destructive testing is performed to the additive manufacturing workpiece, according to the testing parameters of industrial CT obtained in step 1, to obtain an experiment testing image, and the LOF defect proportion in the workpiece manufactured by additive material is obtained according to the image. It can be understood that non-destructive testing can also be ultrasonic testing with similar steps. The testing signal is a waveform image, which needs to be fitted by comparing a calibration testing signal with an experiment testing signal. Compared with the ultrasound, the industrial CT is more intuitive, but the cost is also higher. Those skilled in the art can understand that the above steps can also be applied to other non-destructive testing methods, and are not limited by the industrial CT and ultrasonic testing.

In some embodiments, the specific steps of step 1 may be manufacturing the standard part, followed by performing non-destructive testing. In this way, the calculation results are more accurate and reliable. However, the specific steps are not limited to this. For example, batch processing and purchase of standard parts can be entrusted in advance, while the non-destructive testing can be performed when necessary.

Summary, the beneficial effects of adopting the manufacturing method of the standard part, the standard part and the testing method for LOF defects, provided in the above embodiments, are that the testing standard part with LOF defects, obtained by adjusting process parameters, more truly reflects the LOF defects of the additive manufacturing workpiece, and obtains more accurate calibration results and testing parameters that can clearly test the LOF defects, so as to improve the accuracy and reliability of the NDT results of LOF defects of the additive manufacturing workpiece. The principle is that, as shown in FIG. 3 to FIG. 5, the inventor found that the LOF defect has other manifestations in addition to the pore defect 3, such as the filling defect 4, that is, a pore is filled with LOF powder. This type of defects account for a certain proportion of the LOF defects. Therefore, it is necessary to manufacture a real standard part with LOF defects by adjusting the process parameters, so as to avoid the problem that the NDT parameters, obtained by the standard part with structural design holes, cannot accurately reflect the LOF defects.

Further, in some embodiments, the testing method also comprises a step 3, performing mechanical test on the additive manufacturing workpiece to obtain mechanical properties of the additive manufacturing workpiece and further obtain a relationship between the LOF defect proportion and the mechanical properties. The mechanical test can be strength assessment tests such as elongation, durability and fatigue. In this way, the performance assessment results can actually analyze and study the relationship between LOF defects and mechanical properties of workpieces, and provide strong theoretical support for the application of additive manufacturing forming workpieces, such as SLM forming workpieces.

Summary, the beneficial effects of adopting the manufacturing method of a standard part, the standard part and the testing method for LOF defects, provided in the above embodiments, are that the testing standard part with LOF defects, obtained by adjusting process parameters, more truly reflects the LOF defects of the additive manufacturing workpiece, and obtains more accurate calibration results and testing parameters that can clearly test the LOF defects, so as to improve the accuracy and reliability of the NDT results of LOF defects of the additive manufacturing workpiece, and further obtain a more accurate and reliable relationship between the LOF defects of the additive manufacturing workpiece and the mechanical properties of the additive manufacturing workpiece.

Although the above embodiments of the present invention are disclosed as above, they are not used to limit the present invention. Any person skilled in the art can make possible changes and modifications without departing from the spirit and scope of the present invention. Therefore, any amendments, equivalent changes and modifications, made to the above embodiments according to the technical essence of the present invention without departing from the technical proposal of the present invention, will fall within the protection scope that is defined in the claims of the present invention.

The invention claimed is:

1. A manufacturing method of a LOF defect standard part, used for non-destructive testing of LOF defects of an additive manufacturing workpiece, comprises:

step A, setting a LOF defect area of the standard part, wherein in the LOF defect area, a proportion of the LOF defect area is occupied by LOF defects, wherein setting the LOF defect area of the standard part comprises setting, as a first proportion value, the proportion of the LOF defect area that is occupied by LOF defects, wherein step A further comprises setting a body area of the standard part, wherein the body area is free of LOF defects;

step B, selecting an additive manufacturing forming process for manufacturing the LOF defect area to obtain a first process parameter of the additive manufacturing forming process corresponding to the first proportion value, and selecting another additive manufacturing forming process for manufacturing the body area to obtain a second process parameter of the another additive manufacturing forming process corresponding to the body area; and step C, performing the additive manufacturing forming process based on the first process parameter to form the LOF defect area, and performing the another additive manufacturing forming process based on the second process parameter to form the body area;

wherein, the additive manufacturing forming process is a laser selective melting forming process, the material in the LOF defect area is Hastelloy X alloy, the first proportion value is 0.4%-5.7%, the first process parameter comprises: a first laser linear energy density of 66 J/m-113 J/m, a first scanning spacing of 0.10 mm-0.12 mm, a first strip width of 7 mm-10 mm, a first strip overlap of 0. mm-0.05 mm, and a first paving powder thickness of 0.02 mm-0.03 mm, the first laser linear energy density is determined by the following formula:

$$a = 753.27e^{\frac{-n}{13.4}} + 0.19$$

wherein a is the first proportion value, and n is the first laser linear energy density.

2. The manufacturing method of claim 1, wherein in the step B, the first proportion value is 5.7%, the first laser linear energy density is 66 J/m, the first scanning spacing is 0.12 mm, the first strip width is 10 mm, the first strip overlap is 0 mm, and the first paving powder thickness is 0.03 mm; or in the step B, the first proportion value is 0.4%, the first laser linear energy density is 113 J/m, the first scanning spacing is 0.1 mm, the first strip width is 7 mm, the first strip overlap is 0.05 mm, and the first paving powder thickness is 0.03 mm; or in the step B, the first proportion value is 1.7%, the first laser linear energy density is 82 J/m, the first scanning spacing is 0.11 mm, the first strip width is 9 mm, the first strip overlap is 0.03 mm, and the first paving powder thickness is 0.03 mm.

3. The manufacturing method of claim 1, wherein in the step B, the another additive manufacturing forming process is a laser selective melting forming process, the material in the body area is Hastelloy X alloy, and the second process parameter of the another additive manufacturing forming process comprises: a second laser linear energy density of 170 J/m-200 J/m, a second scanning spacing of 0.08 mm-0.10 mm, a second strip width of 4 mm-6 mm, a second strip overlap of 0.06 mm-0.1 mm, and a second paving powder thickness of 0.02 mm-0.03 mm.

4. A non-destructive testing method for LOF defects, used for testing LOF defects of an additive manufacturing workpiece, comprises:

step 1, manufacturing the standard part according to the manufacturing method of claim 1, and performing non-destructive testing on the standard part, obtaining a calibration testing signal of the non-destructive testing of the LOF defects of the standard part, to determine a testing parameter of the non-destructive testing; and step 2, performing the non-destructive testing on the additive manufacturing workpiece, according to the testing parameter obtained in the step 1, to obtain an experiment testing signal of the additive manufacturing workpiece, and obtaining a LOF defect proportion of the additive manufacturing workpiece according to the experiment testing signal.

5. The testing method of claim 4, further comprising:

step 3, performing a mechanical test on the additive manufacturing workpiece to obtain a mechanical property of the additive manufacturing workpiece and relationship between the LOF defect proportion and the mechanical property.

6. The testing method of claim 4, wherein the step 1 comprises:

performing the non-destructive testing to obtain the calibration testing signal of the non-destructive testing of the LOF defects of the standard part to determine the testing parameter of the non-destructive testing.

* * * * *